June 4, 1968 L. J. YOUNG 3,386,901

METHOD OF FORMING AN ELECTROLYTICALLY ETCHED PLATE

Filed Feb. 19, 1965

Inventor
Lawrence J. Young
By
Watson, Cole, Grindle & Watson
Attorneys

United States Patent Office 3,386,901
Patented June 4, 1968

1 2

3,386,901

METHOD OF FORMING AN ELECTROLYTICALLY ETCHED PLATE

Lawrence John Young, Woodbridge, Suffolk, England, assignor to Young Research Laboratories Limited, London, England, a British company Filed Feb. 19, 1965, Ser. No. 434,749
Claims priority, application Great Britain, Feb. 27, 1964, 8,275/64
10 Claims. (Cl. 204—143)

Figure 1:
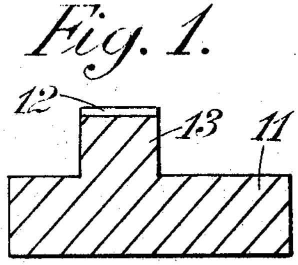

The invention relates to methods of etching and in particular to methods of etching metallic plates to provide raised portions such as are suitable for use as dies in embossing and other applications.

According to the present invention there is provided a method of forming an etched plate having a raised pattern, which method comprises applying to the face of a plate or block of etchable metal a coating of a resist in a pattern corresponding to that of the desired raised pattern, etching away metal from those areas not covered by the resist to form etched areas which are connected by side walls to the areas covered by the resist, stopping the etching process before a significant amount of undercutting has taken place, providing the newly formed side walls with a protective surface, etching away further metal from those areas not covered by the resist to form further etched areas and further side walls, stopping the second etching process before a significant amount of undercutting has taken place and thereafter subjecting the etched plate or block to a further etching step whereby the shoulder which is formed between the first and second side walls is etched away to provide an etched plate having the desired raised pattern and a substantially smooth surface between the face of the raised pattern and the general level of the etched plate.

Preferably, each etching step is carried out such that not more than 0.005″ is etched away and that the procedure is carried out to provide the depth of etch of 0.025″. It will be appreciated that each further etching step is to be carried out only after newly formed side walls, except the final side wall, have been provided with a protective surface of resist.

Preferably the etching step is carried out electrolytically, the metal plate or block with its coating of resist being made an electrode in an electrolytic bath. A preferred electrolytic bath contains sodium chloride and ammonium chloride in proportions of four parts sodium chloride to one part of ammonium chloride.

It is preferred that the side walls formed by each etching step are provided with a protective coating by pressing the plate having a raised portion formed by at least one etching step on a material capable of being displaced so that an impression of the etched plate is formed to form a female mould, filling the mould so produced with protective material, wiping away any excess of protective material from the pad and thereafter placing the etched plate over the pad and subjecting the plate to slight pressure thus pressing the die into the mould and press-fitting the protective material onto the side walls and outer surface of the raised portions of the metal plate.

Accordingly, the side walls may be provided with a protective coating of resist by using the etched metal plate to form a mould for example by pressing the plate on a pad of cardboard or other material, e.g. plastic steel, which is capable of being displaced so that an impression of the etched plate is formed. The mould is filled with resist for example by spreading resist over the surface with a roller or by using a squeegee and the excess of resist on the raised portion of the pad is wiped away. The etched plate is then placed over the pad and subjected to slight pressure which has the effect of pressing the die into the sunken portion of the material and the resist is thereby press-fitted on to the raised portion of the metal plate; accordingly, the side walls, and also the area originally covered by the resist, are provided with a protective surface of resist. This protective surface, it will be understood, serves to prevent or minimise the undercutting which is the useful feature experienced, for example, with electrolytic etching. Any small amount of undercutting which takes place occurs, with the method of this invention, at a greater distance from the etched lines.

An alternative way of providing at least the newly formed side walls of the etched plates with the protective surface of resist consists in smearing resist on to a flat plate of steel, smoothing out the resist with a doctor blade and to allow a measured amount of resist to lay on the flat portion of the steel plate, laying the etched plate on to the resist and gently moving the etched plate in a plurality of directions to work the resist on to the side walls to protect them during the further etching step.

The metal plate may be, for example, aluminum alloy, brass, steel or other such metal which is preferably capable of conducting electricity.

Following is a description by way of example of methods of carrying the invention into effect.

*Example I*

A plate of mild steel was cleaned with a detergent, pumice powder, and water, and then with coarse emery cloth to remove all fine lines in the steel. The plate was washed and dried. The plate was then immersed in phosphoric acid for two minutes, removed, and washed in water and then dried. The plate was heated in an oven at 200° F. for 30 minutes and allowed to cool to room temperature.

A quantity of "K.M.E.R." (a commercially available metal etch resist) was poured over the face of the plate, until the surface was completely covered. The whole of the surface of the plate was covered with the resist and then completely drained off. The plate was stood on end and allowed to dry in a dark cupboard overnight. The resist comprised 50 parts of K.M.E.R. and 50 parts of a commercially available thinner. The following day, the plate was stood in a vacuum frame covered with photographic negative of the desired pattern, and the vacuum pump was switched on to hold the plate and negative in close register in the vacuum frame. The plate was then exposed through the negative arc light for 12 minutes (all bright lights in the room being masked). The vacuum was then broken and the plate and negative removed. The plate was immersed in a solution of a commercially available metal etch developer for 5 minutes and then washed in water. If necessary, the plate may be covered with a commercially available dye to stain on the pattern, but this may weaken the resist and give rise to imperfections in the etched plate. The plate was etched by being placed in a bath consisting of a saturated solution of NaCl and $NH_4Cl$ (4 parts sodium chloride to one part of ammonium chloride). Some of these salts was left in the solution to make sure the whole solution was fully saturated. The plate was made the anode and was held ½″ from a cathode. The solution was kept at room temperature, and a direct current of 10 amps per square inch was passed through the bath for 5 minutes. The plate was taken out of the bath and gently washed to remove sludge and examined; if the resist was good, the plate was again etched for five minutes, again examined and again etched for a further 5 minutes to complete the first etching step with a depth of 0.005″. The plate was then washed and cleaned and examined under a microscope for flaws in the resist, it was then completely dried by playing a gas jet over the plate to remove all moisture. A proprietory resin resist in powder form was then brushed over the plate in the direction of north to south. The excess was brushed off, and the surface was gently heated with a gas jet to melt the resin which was positioned in the shoulders of the raised design. The plate was cooled by laying on a steel plate and when cold the operation was repeated the resin being brushed in the direction of south to north, again heated with gas jet and cooled. A third operation was carried out, this time in the direction of east to west and a fourth operation in the direction of west to east. By these means the whole of the pattern formed by the first etch was covered with the resin in all directions.

The top of the circuit was covered by rolling on "RTV," a rubber preparation available commercially; this was spread over the whole of the raised portion of the plate. The plate was gently dried, placed in the etching bath and given a charge of 10 amps per square inch for 5 minutes, examined, etched for a further 5 minutes and again examined. The plate was again etched to complete a total etching time of 15 minutes for the second etching step. The whole operation was again carried out in successive steps to provide a total depth of etch of 0.025". The plate was then cleaned and "RTV" was rolled solely over the surface of the desired pattern and the plate again etched. This final etching step has the effect of taking out the steps which were made in the earlier etchings, and so smoothing out the rut to provide a reasonably smooth surface between the surface of the raised pattern and the general level of the plate.

Figure 2:
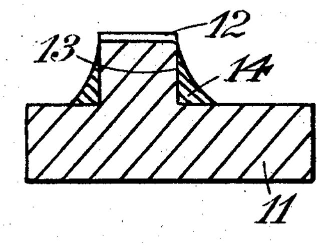
Figure 3:
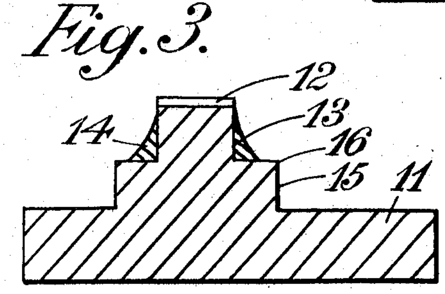
Figure 4:
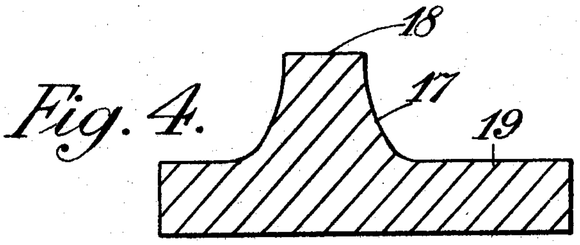

The accompanying drawings illustrate the procedure of this invention. In the drawings FIGURES 1 to 4 illustrate an etched plate at various stages of the etching method. Referring to FIGURE 1, the plate 11 which was originally provided with resist 12 has been subjected to a first etching step whereby side wall 13 has been formed. FIGURE 2 illustrates the plate of FIGURE 1 with the addition of resist 14 which protects the side wall 13. After subjecting the plate of FIGURE 2 to a further etching step the new side wall 15 is formed and removal of the resist 14 reveals the shoulder 16. After subjecting the plate shown in FIGURE 3 to a further etching step the shoulder which is formed between the first and second side walls, 13 and 15 respectively, is etched away to provide an etched plate having the desired raised pattern and a substantially smooth surface 17 between the face 18 of the raised pattern and the general level 19 of the etched plate.

*Example II*

A rectangular block of mild steel was cleaned and prepared in a manner as described in the first example and the required design was photographed from a negative. The plate was immersed in an electrolytic tank containing a salt solution, also as hereinbefore described in Example I, at room temperature. The plate was made the anode and etching was begun, and continued until the portion of the steel plate not covered with the photo resist was etched to a depth of 0.005", and the plate was subsequently removed and cleaned. The whole partially etched surface of the plate was next sprayed with a solution of a plastics material, as used in the protective moth balling of steel, until the whole plate including the raised design and sides of the raised design was covered by a layer of the plastic material 0.001" thick. A small amount of Devcon A, Plastic Steel was mixed and placed in a frame of wood, of dimensions great enough to enable the steel plate to fit inside. The steel plate now covered with plastic protective layer was coated with Devcon Release Agent to prevent sticking and was pressed on to the soft Devcon A, in order to obtain an impression of the steel plate's coated surface. The coated steel plate was subsequently removed from the Devcon A mould, the moth ball plastic material was stripped off, and the plate was cleaned. The Devcon A mould meanwhile was allowed to stand for two hours in order that the impression made on it by the coated steel plate should set firm. Because the Devcon A mould had been taken from the coated steel plate, the mould was between 0.001" and 0.002" oversize as compared with the steel plate after stripping and cleaning. The stripped plate therefore fitted readily but snugly into the Plastic Steel mould.

The mould, having set, was wiped across in all directions with a rubber holding a resist, this being an S.S. Catalyser Resist White, available commercially, though other resists could have been employed. The action of wiping the resist across in all directions had the effect of causing the resist to fill all the sunken portions of the mould, leaving the surface completely free. The cleaned steel plate containing the raised design of the circuit was next fitted into the resist treated Devcon mould. Since, as already explained, the mould was fractionally oversize, the partially etched pattern on the steel plate's surface was able to sink into the mould. On removal of the steel plate from the mould it was found that the top and walls of the partially etched design were covered with the resist, while the floor portions of the partially etched design were resist free. After the resist had been given time to dry, the plate was replaced in the electrolytic bath and etching was recommenced; the raised portions now all being protected from attack.

*Example III*

A steel plate was etched to a depth of .005" by the method described above, and the design thus produced was brushed in all directions with powdered resin, as hereinbefore described. After heating to melt and flow the resin over the walls of the raised design, the plate was subjected to further etching, to give a total depth etch of .01". The plate at this stage was then treated with the plastic as described in the second example as being useful for moth balling steel to enlarge the whole of the raised design by .001" and the method using Devcon A was commenced. This gave a deeper impression in the Devcon mould and appeared very satisfactory.

*Example IV*

A steel plate was etched to a depth of .005" and sprayed with a moth ball plastic to cover the design, enlarging the whole of the raised design by .001". The moth ball plastic covered partially etched plate was painted with Devcon Release Agent, to prevent sticking, and pressed into a frame containing Devcon A to produce a female design, oversize to the design etched on the plate.

The oversize female impression was filled with resist, the resist being applied in all directions by means of a rubber squeegee so that it filled the sunken portions of the female impression, leaving the top clean. The moth ball plastic was stripped off the partially etched plate and the plate was cleaned and pressed into the female mould. In this way, the top, walls and side of the partially etched design on the steel plate were covered with resist and thus protected during the subsequent second etching operation.

I claim:

1. A method of forming an etched plate having a raised pattern, which method comprises applying to the face of a plate of etchable metal a coating of a resist in a pattern corresponding to that of the desired raised pattern, etching away metal from those areas not covered by the resist to form etched areas which are connected by side walls to the areas covered by the resist, stopping the etching process before a significant amount of undercutting has taken place, providing the newly formed side walls with a protective surface, etching away further metal from those areas not covered by the resist to form further etched areas and further side walls, stopping the second etching process before a significant amount of undercutting has taken place and thereafter subjecting the etched plate to a further etching step whereby the shoulder which is formed between the first and second sidewalls is etched away to provide an etched plate having the desired raised pattern and a substantially smooth surface between the face of the raised pattern and the general level of the etched plate.

2. A method of forming an etched plate as claimed in claim 1 wherein each etching step is carried out such that not more than 0.005″ is etched away.

3. A method of forming an etched plate as claimed in claim 1 wherein the procedure is carried out to provide a depth of etch of at least 0.025″.

4. A method of forming an etched plate as claimed in claim 1 wherein the etching steps are carried out electrolytically, the metal plate with its coating of resist being made an electrode in an electrolytic bath.

5. A method of forming an etched plate as claimed in claim 4 wherein the electrolytic bath contains sodium chloride and ammonium chloride in the proportions of about four parts sodium chloride to one part of ammonium chloride.

6. A method of forming an etched plate as claimed in claim 1 wherein the side walls formed by each etching step are provided with a protective coating by pressing the plate having a raised portion formed by at least one etching step on a material capable of being displaced so that an impression of the etched plate is formed, to form a female mould, filling the mould so produced with protective material, wiping away any excess of protective material from the pad and thereafter placing the etched plate over the pad and subjecting the plate to slight pressure thus pressing the die into the mould and press-fitting the protective material onto the side walls and outer surface of the raised portions of the metal plate.

7. A method as claimed in claim 6 wherein the material capable of being displaced is cardboard.

8. A method of forming an etched plate as claimed in claim 6 wherein the pad of material capable of being displaced to form a mould is a plastic steel.

9. A method of forming an etched plate as claimed in claim 8 wherein the partially etched steel plate is provided with a thin plastic layer before the etched steel is pressed on the material capable of being displaced to form a mould.

10. A method of forming an etched plate as claimed in claim 1 wherein the side walls formed by each etching step are provided with a protective coating by smearing protective coating onto a flat plate of steel, smoothing out the coating and allowing a measured amount to lay on the flat portion of the steel plate, laying the partially etched plate onto the protective coating and gently moving the etched plate in a plurality of directions to work the protective coating on to the side walls.

References Cited

UNITED STATES PATENTS

| | | | |
|---|---|---|---|
| 1,376,365 | 4/1921 | Wertheimer | 204—143 |
| 2,695,351 | 11/1954 | Beck | 204—143 |
| 3,031,302 | 4/1962 | Bayer | 96—36 |

ROBERT K. MIHALEK, *Primary Examiner.*